Figure 1:
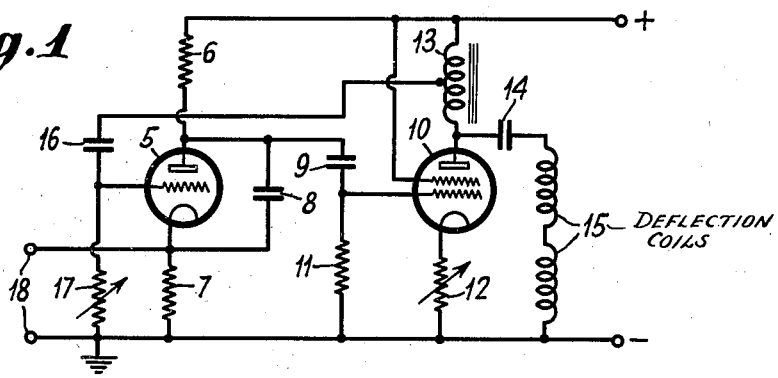

Aug. 26, 1941.  C. L. FAUDELL  2,254,031
RELAXATION OSCILLATION GENERATOR
Filed Nov. 1, 1938

INVENTOR
CHARLES LESLIE FAUDELL
BY
ATTORNEY

Patented Aug. 26, 1941

2,254,031

UNITED STATES PATENT OFFICE 2,254,031

RELAXATION OSCILLATION GENERATOR

Charles Leslie Faudell, Stoke Poges, England, assignor to Electric & Musical Industries Limited, Hayes, Middlesex, England, a company of Great Britain Application November 1, 1938, Serial No. 238,181
In Great Britain November 3, 1937

5 Claims. (Cl. 250—36)

This invention relates to relaxation oscillation generators for generating substantially saw tooth oscillations. These generators may comprise a condenser which is charged from a current source and discharged by means of a thermionic valve; the relatively slow charge forming the long flank of the saw tooth and the relatively quick discharge forming the short flank of the saw tooth. Alternatively, the generators may comprise a condenser which is discharged slowly to form the long flank of the saw tooth and charged quickly through a thermionic valve to form the short flank of the saw tooth. In some cases, in order to provide a push-pull output the generator may comprise two condensers, one of which is charged slowly and discharged quickly and the other which is discharged slowly and charged quickly. The voltage set up across the condenser is amplified by a further valve and the frequency of the oscillations is controlled by means of controlling pulses.

Oscillation generators of this kind can be employed for a variety of purposes, but they are especially applicable for use in television systems, the controlling pulses being the synchronising pulses normally used in television systems.

In some cases it may be found that the controlling pulses which is applied to the valve is of such a small amplitude that it fails to control the oscillation generator.

It is the chief object of the present invention to provide an improved oscillation generator of the above kind in which the generator is controlled despite the controlling impulses being of relatively small amplitude.

According to the present invention, there is provided an impedance device associated with a source of charging current and with a thermionic valve which is arranged so that when controlling pulses are applied to said valve substantially saw tooth waves are set up by said impedance device and wherein an amplifying circuit is provided including a further thermionic valve for amplifying the saw tooth waves, the arrangement being such that said first mentioned valve, or substantially simultaneously with the application of said pulses to the first valve, are applied to said further valve so as to be amplified thereby and then applied to said first valve so that the generator can be controlled by pulses of relatively small amplitude.

The invention is particularly applicable for use with the kind of circuit disclosed in my co-pending United States application Serial No. 185,493, filed January 18, 1938, patented on August 27, 1940 as Patent No. 2,212,933, where the synchronising pulses derived from the separating circuit disclosed in this specification may be of relatively small amplitude, of the order of about one volt.

In one form of the invention the controlling pulses may be applied across a resistance disposed between the cathode of the first valve and earth, the condenser which is charged, as above stated, being connected between the cathode and of said resistance and the anode of the valve. In another form of the invention the controlling pulses may be applied across a resistance connected between the anode of the first valve and earth and arranged in series with the said condenser.

Figure 3:
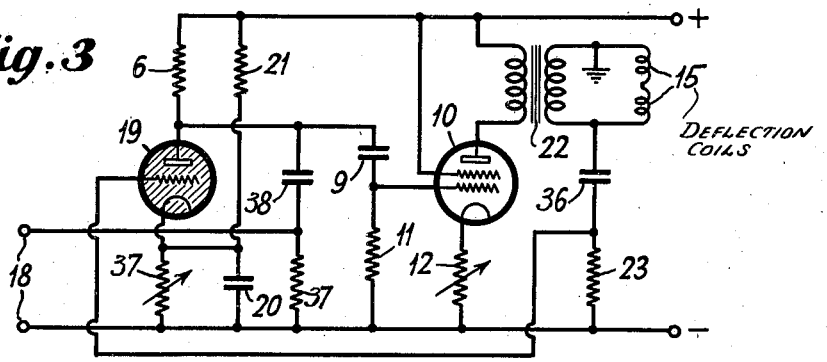
Figure 4:
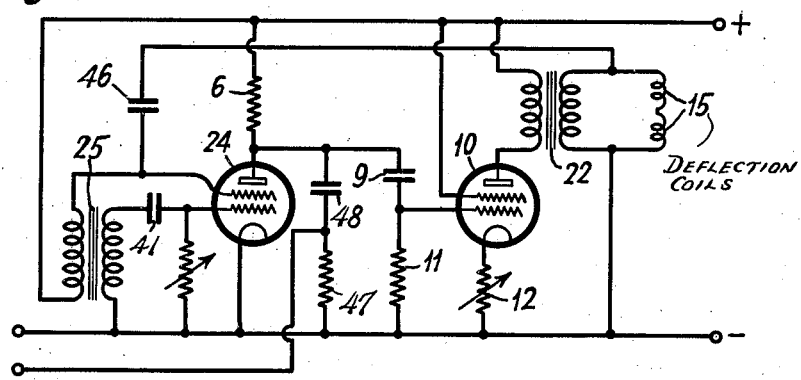
Figure 2:
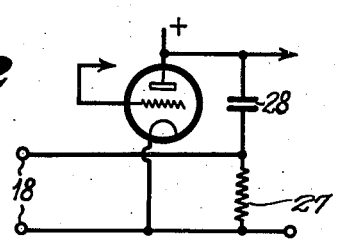

In order that the invention may be clearly understood and readily carried into effect, it will now be more fully described with reference to the accompanying drawing in which:

Figure 1 illustrates an oscillator constructed in accordance with one form of the invention, Figure 2 illustrates a part of the circuit shown in Figure 1 embodying a modification, Figure 3 illustrates a modified form of oscillator circuit employing a gas discharge valve, and Figure 4 illustrates the application of the invention to a blocking oscillator.

Referring now to Figure 1 of the drawing, the reference numeral 5 indicates the first valve the anode of which is connected through a resistance 6 to the positive terminal of a source of anode current, not shown, whilst the cathode of the valve is connected through a resistance 7 to the negative terminal of the anode current source which is earthed.

Between the cathode end of the resistance 7 and the anode of the valve 5 is a condenser 8 which is periodically charged from the anode current source and discharged when the valve 5 is rendered conducting as hereinafter referred to. The anode of the valve 5 is connected through a condenser 9 to the control grid of the screen grid amplifier valve 10, a leak resistance 11 being provided, as shown. The cathode of the valve 10 is connected through a variable resistance 12 to the negative terminal of the anode current source whilst the anode of the valve 10 is connected through a choke coil 13 to the positive terminal of the source, the screening grid of the valve 10 also being connected to said positive terminal, as shown. In Figure 1 the output from the valve 10 is used for the application of a saw-tooth current wave to the scanning coils of a cathode ray tube the anode of the valve 10 being connected through a blocking condenser 14 to the scanning coils indicated at 15. A tapping on the choke coil 13 is connected to the grid of the valve 5 through a blocking condenser 16 which is associated with a leakage path comprising a variable resistance 17. Controlling or synchronising pulses are applied across the resistance 7 from terminals 18. In operation of the circuit the valve 5 is normally non-conducting and during this period the condenser 8 charges through the resistance 6 positively, the positive potential across the condenser 8 being applied to the valve 10 and amplified, the amplified saw-tooth current being fed through the scanning coils 15. On receipt of a controlling pulse the valve 5 is caused to conduct to discharge condenser 8, conduction of the valve 5 occurring until the condenser 16 assumes such a charge due to the interaction of the valves 5 and 10 that anode current ceases to flow through the valve 5. The charge across condenser 16 leaks away through the resistance 17. Since the controlling pulses are applied across the resistance 7, the upper end of which is connected to the condenser 8, the controlling pulses are applied simultaneously to the valve 5 and to the valve 10, the latter valve amplifying the controlling pulses which are applied from the coil 13 to the grid of the valve 5. In this manner, despite the fact that the controlling pulses may be of relatively small amplitude, the valve 5 rapidly reaches the condition in which it is rendered conducting to discharge the condenser 8 due to the amplification of the controlling pulse by the valve 10. Charging of the condenser 8 generates the long flank of the saw-tooth voltage wave whilst discharge of the condenser generates the short flank. The circuit shown in Figure 1 is self-oscillatory in the absence of controlling pulses, the latter being employed for synchronising purposes to initiate the discharge. The effect of a small amplitude controlling pulse if it were not for the amplification of the pulse which occurs according to the invention, would be to make the frequency adjustment (resistance 17) very critical and moreover, there would be no margin to allow for natural frequency drift.

Figure 2 of the drawing illustrates a modification of the circuit shown in Figure 1, in which instead of the resistance 7 being connected between cathode and earth and the condenser 8 connected to the cathode of the valve 5 as shown in Figure 1, a resistance 27 and condenser 28 are arranged in series between the anode and cathode of the valve 5. The other components of the circuit which are not shown will be arranged as in Figure 1. In this case therefore the controlling pulses are applied first to the valve 10 which is not shown in Figure 2. The arrangement shown in Figure 1 is, however, advantageous compared with that shown in Figure 2, since the potential drop across the resistance 7 during conduction of the valve 5 is partially neutralised by the potential rise during conduction thus avoiding a disturbing feedback into the source from which the controlling pulses are obtained.

It is assumed in Figures 1 and 2 that the controlling pulses are applied to the terminals 18 in the negative sense, but in the case where the output from the valve 10 is applied through a transformer to the scanning coils as shown in Figure 3 hereinafter referred to, the controlling pulses may be applied either in a positive or a negative sense according to the point at which the condenser 16 is connected to the secondary of the transformer for the feed-back of the amplified controlling pulses.

Figure 3 of the drawing illustrates the invention as applied to a circuit in which the first valve is a gas-discharge valve, such as a valve of the kind known by the registered trade-mark "Thyratron." In this figure the elements which are equivalent to corresponding elements in Figures 1 and 2 have been given the same reference numerals. In this case the first valve, which as stated above, is a gas-discharge valve, is indicated at 19 and a variable self-biasing resistance 37 is connected between cathode and earth and shunted by a decoupling condenser 20 in series with a biasing resistance 21. Controlling pulses are applied to terminals 18 across a resistance 37 which is in series with a condenser 38 connected between the anode of the valve 19 and earth. The output from the valve 10 is applied to the scanning coils 15 through a transformer 22 the secondary of the transformer being connected to earth through a condenser 36 and resistance 23 whilst the grid of valve 19 is connected to the junction between condenser 36 and the resistance 23 so that the controlling pulses applied to the valve 10 are fed back after amplification to the grid of valve 19. The applied controlling pulses may be either in the positive or negative sense according to the connection of the condenser 36 to either the positive or negative end of the transformer secondary winding. Discharge of the valve 19 occurs when the anode potential (i. e. the charge across condenser 38) reaches a critical value in relation to the fixed bias imposed by resistance 27. For synchronising purposes the value of the resistance 27 is adjusted so that the controlling pulse is applied just prior to the instant when the valve 19 would conduct in the absence of the controlling pulse.

Figure 4 of the drawing illustrates the invention as applied to a blocking oscillator and the parts which are equivalent to the corresponding parts of Figures 1, 2 and 3 have been given the same reference numerals. In this example, the first valve 24 is of the screen grid type and the screening grid and the control grid are coupled together through a transformer 25 so that when the valve 24 is caused to conduct on application of an amplified controlling pulse from the valve 10 oscillation of the valve 24 is initiated and continues until the blocking condenser 46 assumes such a potential that the valve 24 is biased to cut-off. In Figure 4 the output from the valve 10 is applied to the scanning coils 15 from a transformer 22 and the secondary winding of the transformer 22 in this case is connected through the condenser 46 to the screening grid of the valve 24. In this example also a resistance 47 and condenser 48 are arranged as shown in Figures 2 and 3. Positive or negative controlling pulses may be applied according to the connection of the condenser 46 to the secondary winding of the transformer 22. The value of the condensers 36 in Figure 3 or of condenser 46 in Figure 4 may be quite small since it is only normally necessary to apply the higher frequency of the leading edge of the controlling pulse to the circuit in order to intiate the discharge period of the valves 19 and 24.

The condenser 46 provides a positive feed back as in the case of Figure 1. This is liable to modify the frequency of the blocking oscillator, especially with changes of amplitude. It is therefore an advantage to take the amplified pulse from the secondary winding in opposite phase and connect the condenser 16 to the screen of the valve 24.

The invention in the above embodiments has been described with reference to the generation of saw-tooth currents for the scanning coils 15, although it will be appreciated that the invention will also be applied for the generation of substantially saw tooth potential waves for, for example, electrostatic deflection of a cathode ray beam.

Although in the above embodiments the condenser is charged slowly to provide the long flank of the saw tooth and discharged quickly through a thermionic valve to provide the short flank, it is obvious that this invention may be applied to relaxation oscillation generators of the type in which a condenser is charged quickly through a thermionic valve to produce the short flank of the saw tooth and discharged slowly through a resistance shunting the condenser, to provide the long flank. An example of this type of generator is shown in Figure 1 of the specification of British Patent No. 471,737. In accordance with this invention, the saw tooth voltage set up across condenser 15 of this figure would be amplified by a further valve and controlling pulses applied in such a manner that they would be amplified by said further valve and then applied to the grid of valve 10.

In Figure 5 of the specification of British Patent No. 471,737 there is shown a relaxation oscillation generator from which a push-pull output is obtained. The condenser 43 is charged slowly and discharged quickly, whereas condenser 38 is charged quickly and discharged slowly. In accordance with this invention the voltages across condensers 38 and 43 would be amplified by means of a suitable push pull amplifier and the controlling pulses applied to the amplifier in such a manner that they would be amplified and fed back to the grid of valve 36. The controlling pulses may be for example fed to the push-pull amplifier by means of a transformer and amplified pulses fed back through a transformer or from across the load of one of the valves of the push-pull amplifier.

I claim:

1. A sawtooth wave generator comprising a condenser, a first thermionic vacuum tube having anode, cathode and at least one control electrode, said condenser being shunted across the anode and cathode of said thermionic tube, a resistance connected serially between said cathode and a point of fixed reference potential, said condenser being electrically connected to said point of fixed reference potential, means joining the control electrode of said thermionic vacuum tube to the point of fixed reference potential, a second thermionic vacuum tube having anode, cathode and at least one control electrode, means for coupling the storage condenser and resistance to the control electrode of said second thermionic vacuum tube, an inductive member connected in the anode-cathode circuit of said second thermionic vacuum tube, and means coupling said inductive member to the control electrode of said first thermionic vacuum tube.

2. Apparatus in accordance with claim 1 wherein there is provided in addition means for impressing signals from an external source onto the resistance member connected serially between the cathode and the point of fixed reference potential in said first thermionic vacuum tube.

3. A sawtooth wave generator comprising a condenser, a first thermionic vacuum tube having anode, cathode and at least one control electrode, said condenser being shunted across the anode-cathode space discharge path thereof, a point of fixed reference potential, an impedance member connected between said cathode and said point of fixed reference potential, a second thermionic tube having anode-cathode and at least one control electrode, means for applying the voltage across said condenser and impedance to the control electrode-cathode circuit of second thermionic tube, whereby variations in potential of said condenser are impressed on to the control electrode-cathode circuit of second thermionic tube, and means for feeding back a portion of the energy developed in the output circuit of said second thermionic tube to the control electrode of said first thermionic tube.

4. Apparatus in accordance with claim 3, and means for impressing signals received externally of the apparatus across the impedance connected between the cathode of the first thermionic tube and the point of fixed reference potential.

5. Apparatus in accordance with claim 3, wherein there is provided in addition a variable resistor connected between the control electrode of said first thermionic tube and the point of fixed reference potential.

CHARLES LESLIE FAUDELL.